(12) United States Patent
Ho

(10) Patent No.: US 7,377,556 B2
(45) Date of Patent: May 27, 2008

(54) SELF-CENTERING ADAPTER

(76) Inventor: David Gian-Teh Ho, 23685 Ridgecrest Ct., Diamond Bar, CA (US) 91765

( * ) Notice: Subject to any disclaimer, the term of this patent is extended or adjusted under 35 U.S.C. 154(b) by 169 days.

(21) Appl. No.: 11/266,653

(22) Filed: Nov. 2, 2005

(65) Prior Publication Data

US 2007/0096462 A1    May 3, 2007

(51) Int. Cl.
*F16L 19/00*    (2006.01)
(52) U.S. Cl. .................... 285/338; 285/382.5
(58) Field of Classification Search ............ 285/382.4, 285/382.5, 258, 338
See application file for complete search history.

(56) References Cited

U.S. PATENT DOCUMENTS

| | | | | |
|---|---|---|---|---|
| 775,124 | A | * | 11/1904 | Christman ................ 138/89 |
| 1,108,313 | A | * | 8/1914 | Anderson ................ 417/513 |
| 3,542,076 | A | * | 11/1970 | Richardson ............... 138/89 |
| 4,534,116 | A | | 8/1985 | Davis |
| 5,608,189 | A | * | 3/1997 | Winterhoff et al. ......... 174/656 |
| 5,687,998 | A | * | 11/1997 | Pan ......................... 285/338 |
| 6,406,067 | B1 | * | 6/2002 | Pritchatt ................... 285/197 |
| 6,471,254 | B2 | * | 10/2002 | Russell ..................... 285/338 |
| 6,786,517 | B2 | * | 9/2004 | Shumard ................... 285/374 |

* cited by examiner

*Primary Examiner*—David Bochna
(74) *Attorney, Agent, or Firm*—Christie, Parker & Hale, LLP

(57) ABSTRACT

An adapter mount for attaching to a fitting tube includes an adapter tube having an outer circumferential surface; a first expandable ring placed on the outer circumferential surface of the adapter tube and comprising of elastic material for expanding and fitting to the inner surface of the fitting tube; an adjustment ring configured to be threaded to the adapter tube to generate a rotational threading force; a compression ring for translating the rotational threading force from the adjustment ring to a longitudinal compressing displacement of the first expandable ring, causing an outer surface of the first expandable ring to fit to the inner surface of the fitting tube; and a stop attached to the adapter tube for preventing the adjustment ring from separating from the adapter tube.

8 Claims, 5 Drawing Sheets

SELF-CENTERING ADAPTER

FIELD OF THE INVENTION

The invention relates to a quick and easy adapter mount, which securely and accurately attaches to and auto centers in a fitting tube.

BACKGROUND OF THE INVENTION

Accurately and quickly center fitting a tube or rod into another tube (an adapting tube) has been a constant challenge for users in a variety of fields. A conventional way to accomplish this is to thread both the adapter and the adapting tube together to ensure the strength and centering of the fitting. However, this method requires time consuming threading action during loading and unloading process. In addition, different thread specifications for the adapter and the adapting tube from different manufactures give rise to compatibility problems.

The focuser draw tube of a telescope also have this problem. For example, the slop between a laser collimator and the focuser draw tube exists in all telescope focusers. When a user racks the laser collimator in and out, the slop has a large impact on the position of the laser beam. In fact, just tightening a "set screw" on the focuser can often make the laser beam move around considerably. In short, any small mis-alignment of installed laser collimator in the focuser draw tube substantially affected aligning the telescope.

Therefore, there is a need for a quick and easy adapter mount, which securely and accurately centered attaches to an adapting tube.

SUMMARY OF THE INVENTION

In one embodiment, the invention is an adapter mount for attaching to a fitting tube. The adapter mount includes an adapter tube having an outer circumferential surface; a first expandable ring placed on the outer circumferential surface of the adapter tube and comprising of elastic material for expanding and fitting to the inner surface of the fitting tube; an adjustment ring configured to be threaded to the adapter tube to generate a rotational threading force; a compression ring for translating the rotational threading force from the adjustment ring to a longitudinal compressing displacement of the first expandable ring, causing an outer surface of the first expandable ring to fit to the inner surface of the fitting tube; and a stop attached to the adapter tube for preventing the adjustment ring from separating from the adapter tube.

The adapter mount may include a second expandable ring placed on the outer circumferential surface of the adapter tube and comprising of elastic material for expanding and fitting to the inner surface of the fitting tube; and a spacer placed on the outer circumferential surface of the adapter tube for keeping the first expandable ring and the second expandable ring apart at a predetermined distance. The stop may be a ring stop threaded to the adapter tube or a set-screw affixed to the adapter tube.

The fitting tube may be a telescope eyepiece adapter, a gun-sight barrel adapter, a water pipe, and the like.

BRIEF DESCRIPTION OF THE DRAWINGS

These and other features, aspects and advantages of the present invention will be more fully understood when considered with respect to the accompanying drawings, wherein.

DETAILED DESCRIPTION

A self-centering adapter according to the present invention provides effective mounting and accurate auto-centering function without additional threads requirement for the fitting tube. The adapter can accurately center-seal to accommodate adapting surfaces with small imperfections, such as dents, scratches, or manufacturing diameter tolerances. The adapter can be widely used in many applications where a device requires precision adapting such as gun-sight barrel adapter, telescope eyepiece adapter, detachable fishing rod, quick release hook, and the like.

In one embodiment, the present invention is a self centering adapter for use in a tube-like set up, for example, in a telescope eyepiece adapter. The adapter includes an expandable ring that expands as being inserted to an adapting tube to friction fit the inner diameter of the adapting tube. This way, the expandable ring automatically adjusts to the same center axis of the fitting tube at the final fitting position.

Figure 1:
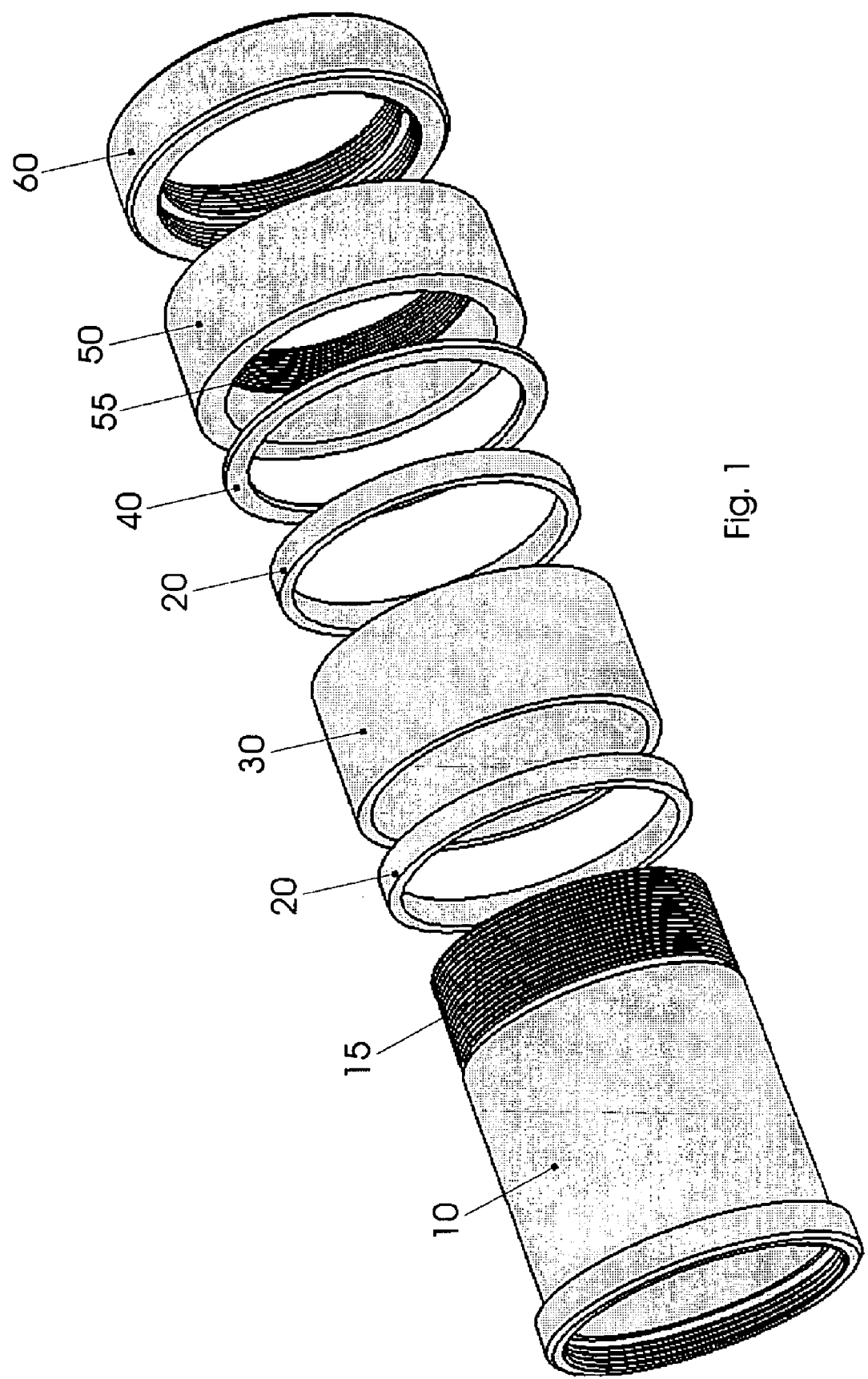
FIG. 1 is a perspective view of a self-centering adapter components, according to one embodiment of the present invention.
Figure 2:
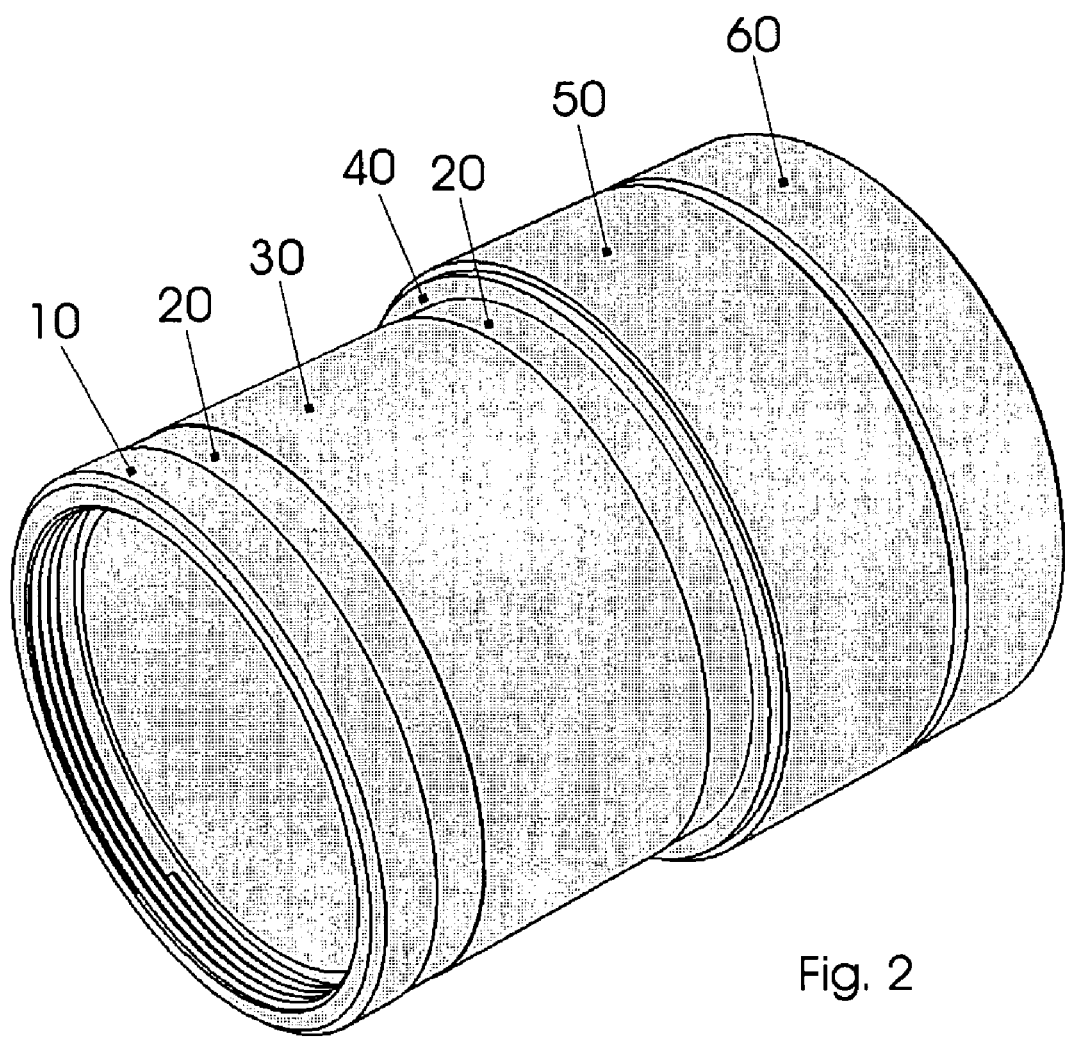
FIG. 2 is a perspective view of an assembled adapter, according to one embodiment of the present invention.

FIG. 1 is a perspective view of self-centering adapter components and FIG. 2 is a perspective view of the assembled adapter, according to one embodiment of the present invention.

As shown in FIGS. 1 and 2, an adapter 1 includes six parts, an adapter tube 10, an expandable ring 20 (preferably two, as shown), a spacer 30, a compression ring 40, an adjustment ring 50, and a ring stop 60. The adapter tube 10 essentially provides the structural integrity of the adapter to allow all the components to function along its center axis. The expandable ring(s) 20 provide a key adapting mechanism when compressed. The spacer 30 keeps the two expandable rubber rings 20 apart at a designated distance to have at least two secure supporting points alone the fitting distance which keeps the adapter from pivoting after it is fully fitted. In one embodiment, the spacer is optional, if centering the adapting tube is not important, for example, in a broken water pipe replacement joint. The expandable ring(s) 20 comprise of elastic material, such as rubber that allow the rings to expand and tightly fit the adapting tube. The above components (except for the expandable ring(s) that comprise of elastic material) may be made of metal and/or plastic, or similar material.

In one embodiment, the adapter may be used for temporary water sealing purposes such as, adapting to a worn-out water pipe thread or a broken sprinkler pipe head. A user can twist the adjustment ring (60) to fit a new sprinkler head or plug in the broken pipe's inner diameter without worrying which type of thread they should use to seal the opening. In this embodiment, the expandable ring(s) 20 comprise of elastic and water sealant material such as rubber.

The compression ring 40, using materials with a less friction characteristic (e.g., nylon), serves as a smooth interface translating the rotational-threading force from the adjustment ring 50 to the longitudinal compressing displacement of the expandable rings 20. The ring stop 60 prevents the adjustment ring 50 from rotating and detaching from the adapter assembly. The rotation of the expandable ring may create unnecessary uneven shear force on the contacting rim surface of the expandable ring. The thread area 15 may be used for the ring stop 60 and/or for the adjustment ring 50. In one embodiment, the ring stop 60 uses the same thread as the adjustment ring 50. This way, the device is simpler and cheaper to produce (all with the same type of thread, one thread tooling takes care of all).

Figure 3A:
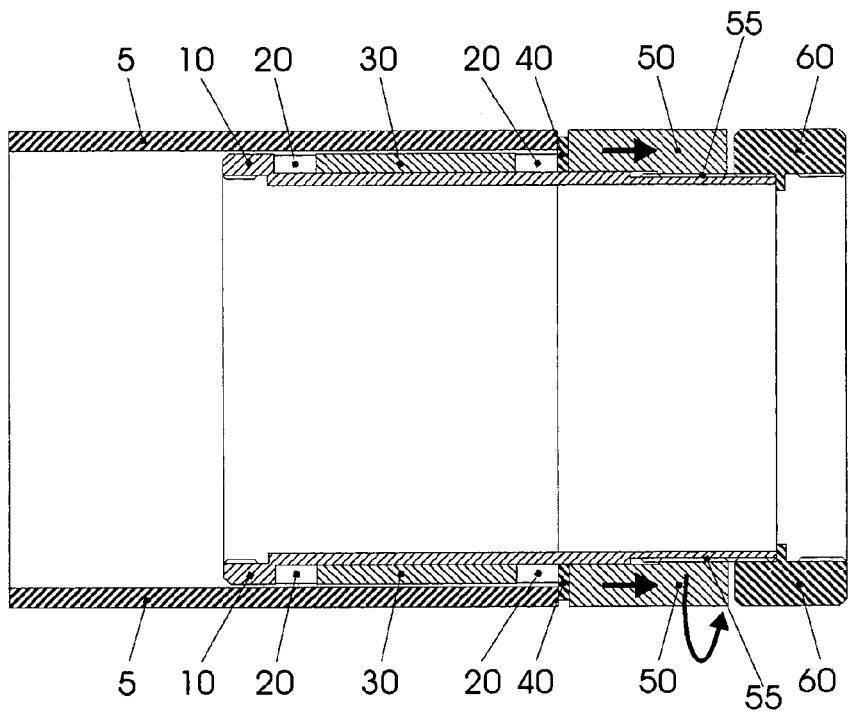
FIG. 3A is a side and cross-section view during insertion and removal stage, according to one embodiment of the present invention.
Figure 3B:
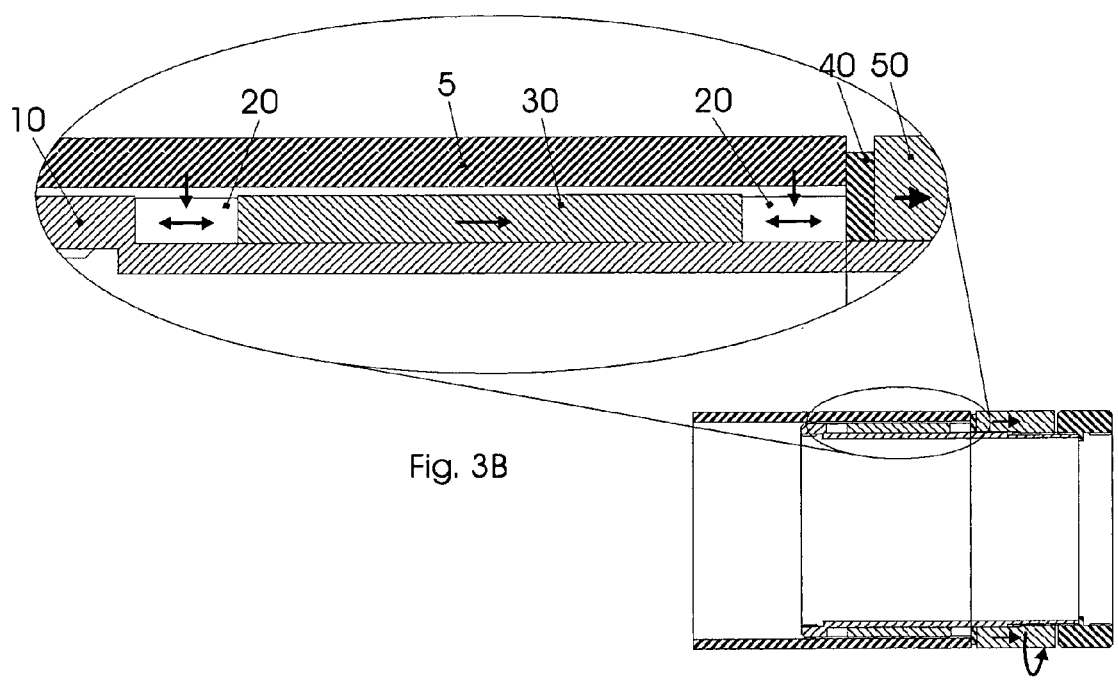
FIG. 3B is an enlarged side and cross-section view during the insertion and removal stage, according to one embodiment of the present invention.

In one embodiment, the expandable ring 20 is a square-shaped rubber ring which resides in the outer circumferential groove of the adapter tube 10. The substantially square shape allows the expandable ring to change its outer diameter according to the fitting tube's inner diameter. The square-shaped ring 20 is formed to provide at least two supporting points in the parallel direction to the tube axis to prevent any pivoting. Here, the expandable ring 20 is referred to as "square-ring" simply because the edges are not round like a typical o-ring. Once expanded, the outer surface of the rubber ring 20 serves to fit to the inner wall of a fitting tube. The expandable ring 20 is shown in FIGS. 3A and 3B at a none-compressed state. In one embodiment, the cross-section shape is not square but rather rectangular.

Figure 5A:
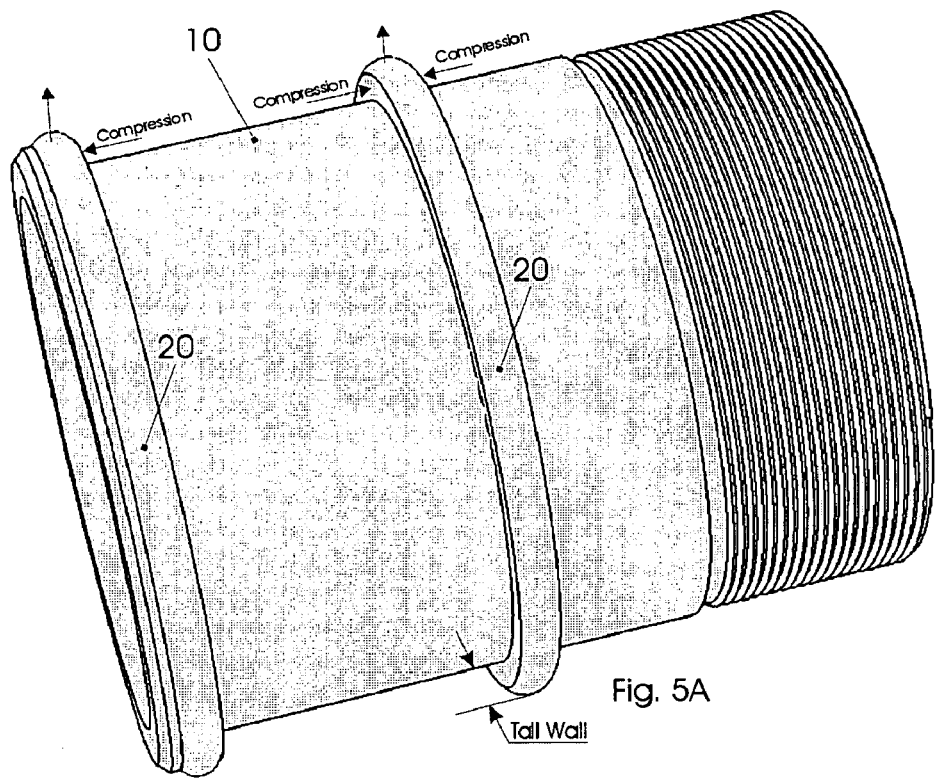
FIG. 5A depicts an expandable rubber ring in an elongated state, according to one embodiment of the present invention.
Figure 5B:
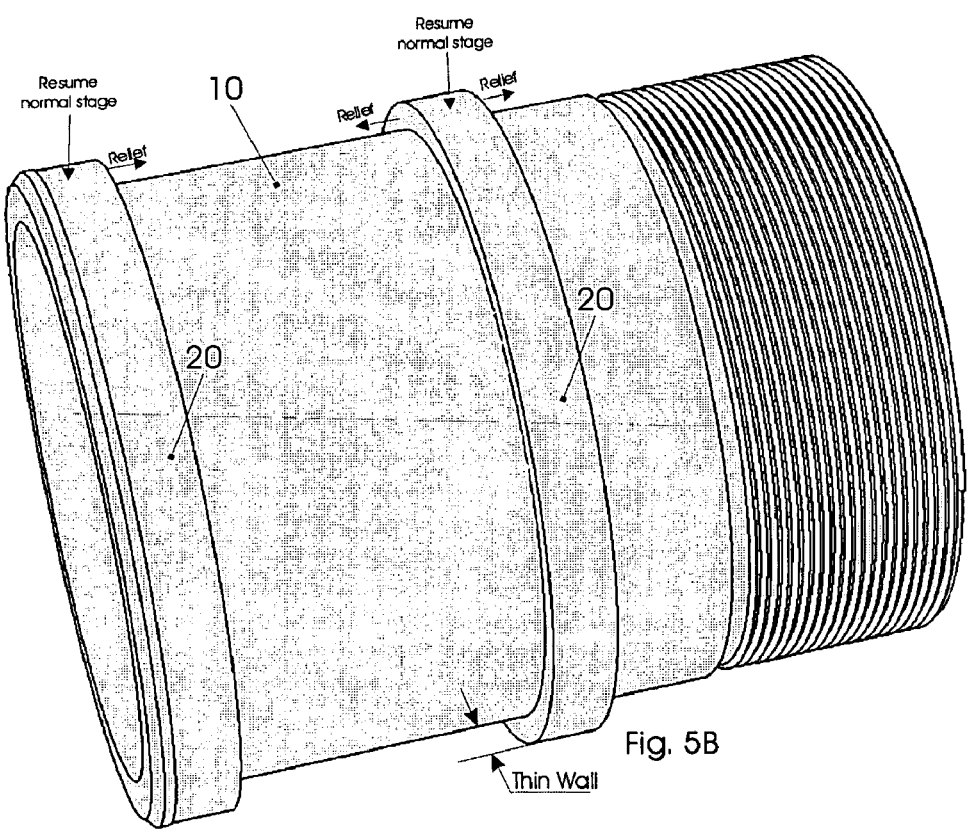
FIG. 5B depicts an expandable rubber ring in a normal state, according to one embodiment of the present invention.

FIG. 5A depicts the expandable rubber ring 20 in an elongated state as being inserted to the adapting tube to friction fit the inner diameter of the adapting tube and FIG. 5B depicts the expandable rubber ring 20 is a normal state, that is, when not pressed. The expandable rubber ring can be compressed, and resume back to its normal/natural non-compressed stage because of its memory effect. Although, the expandable rings are sometimes referred to as expandable rubber rings, they are not limited to rubber and can be made of any elastic type material.

FIG. 3A is a side and cross-section view during insertion and removal stage, and FIG. 3B is an enlarged side and cross-section view during the insertion and removal stage of the adapter to/from a fitting tube 5, according to one embodiment of the present invention. During the initial insert and unloading stage, un-thread the adjustment ring 50 to relief longitudinal compression to the expandable ring(s) 20. With the relief of the longitudinal compression, the expandable rings 20 resume to their natural stage at thinner wall, which results in slightly smaller diameter. The natural (when not compressed) diameter of the expandable ring 20 allows the adapter to insert or remove freely into or from the fitting tube 5. Here, the distance between the expandable ring's inner diameter and outer diameter is smaller because of its elongated shape. When the expandable ring is compressed in the direction of its center axis, it can only be squeeze upward or outward, that is, away from its center axis which increases the outside diameter of the square ring, because its inner diameter is fixed around the adapting tube.

In one embodiment, the spacer 30 and the compression ring 40 move (in concert) forward or back alone the adapter's center axis, as the adapter is inserted to the fitting tube 5, to expand the diameter of the rubber ring(s) 20. The travel displacement of the spacer 30 and the compression ring 40 is pushed by the adjustment ring 50. The threading of the adjustment ring 50 expands the diameter of the rubber ring(s) 20 to accommodate the fitting tube's 5 inner diameter for an evenly internal surface friction mount. The self centering adapter may be inserted into various fitting tubes, such as, a laser device, a gun-barrel, a telescope's focuser draw tube, or any other fitting tube or rod (e.g., camera tripods, outdoor umbrella, water pipes, and any other set up that requires two tube/rod-like structure to be adapted together).

Figure 4A:
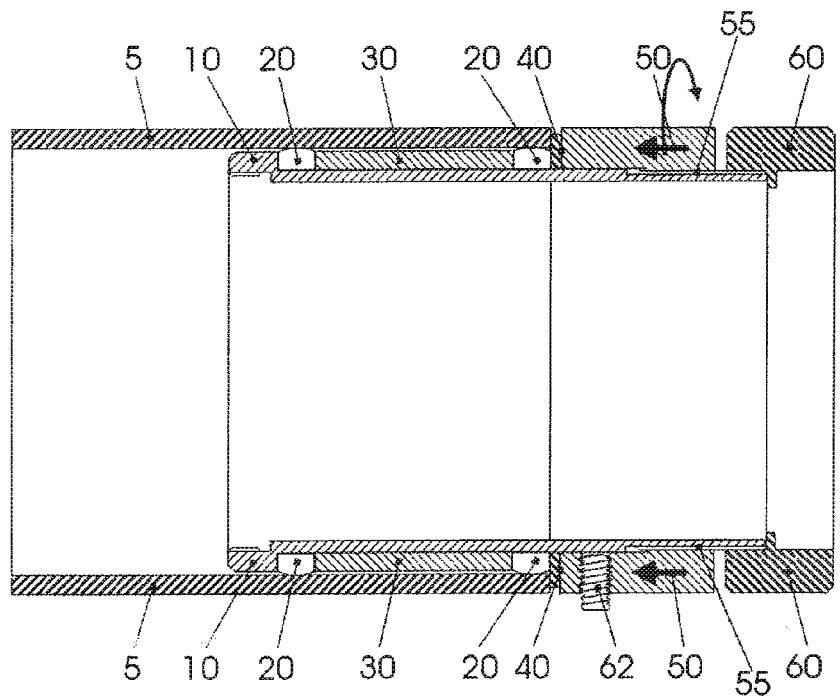
FIG. 4A is a side and cross-section views during locking stage, according to one embodiment of the present invention.
Figure 4B:
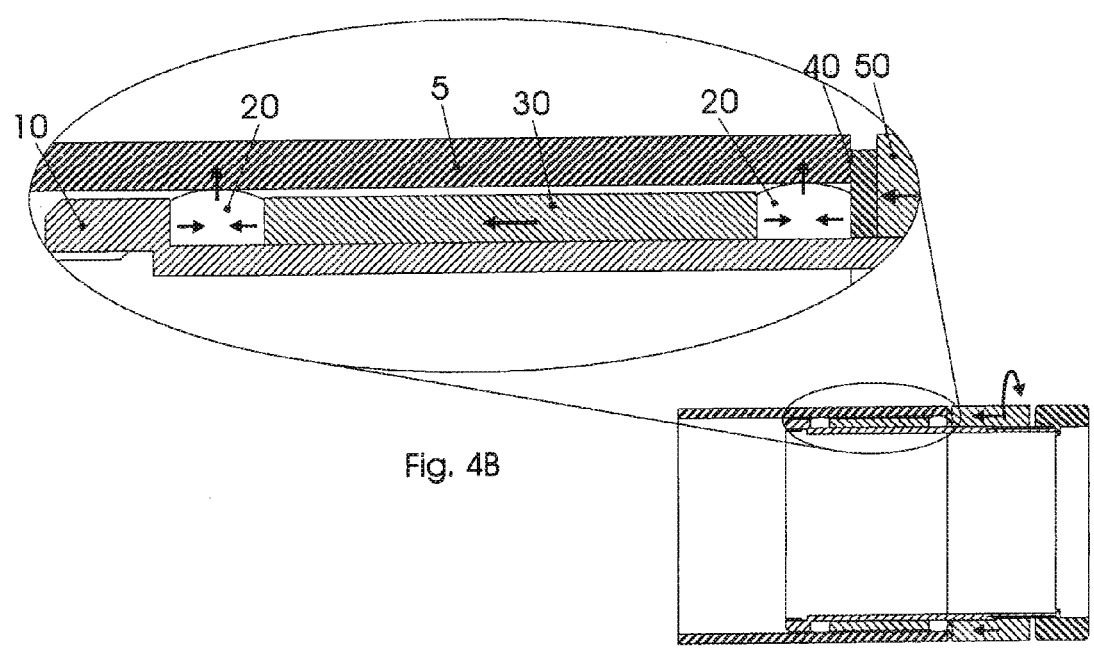
FIG. 4B is an enlarged side and cross-section views during the locking stage, according to one embodiment of the present invention.

FIG. 4A is a side and cross-section views during the locking stage, and FIG. 4B is an enlarged side and cross-section views during the locking stage, according to one embodiment of the present invention. As shown in FIG. 4A, once the adapter is fully inserted against an open end of the fitting tube 5, the user fastens the adjustment ring 50 to compress the expandable ring 20 forward. As shown in FIG. 4B, when expandable rings 20 are compressed in the longitudinal displacement direction, due to their physical characteristics, the contracting longitudinal displacement forces the expandable rings 20 to expand vertically to replace the equal compressed longitudinal volume displacement. This contraction results in an even increase of expandable rings' 20 diameter to automatically snug to the center of the fitting tube 5 and securely surface friction fit the adapter tube 10 to the fitting tube 5.

In one embodiment, the ring stop 60 is not needed. Rather, a set-screw (62 in FIG. 4A) affixed to and sticking out of the adapter tube can be used to stop the adjustment ring from loosening and separating from the adapter tube. This way, the adjustment ring does not come out the entire assembly. In one embodiment, the ring stop is used for attaching the adapter to an eyepiece optics by replacing eyepiece's existing metal tube which is using the same thread to the optics.

In one embodiment, the adapter is sized to fit within most common telescope eyepiece openings such as Newtonian telescope. In a preferred configuration, the adapter has an approximately 1.25 inch, 2 inch, or 0.925 inch diameter and a length of at least 0.5 inch. This way, the adapter fits the standard 1.25 inch, 2 inch, and 0.925 inch focus mechanisms (fitting tube) for most telescopes.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. An adapter mount for attaching to a fitting tube having an inner surface comprising:
   an adapter tube having an outer circumferential surface;
   a first expandable ring placed on the outer circumferential surface of the adapter tube and comprising of elastic material for expanding and fitting to the inner surface of the fitting tube;
   a hollow adjustment ring configured to be threaded to the outer circumferential surface of the adapter tube to generate a rotational threading force;
   a compression ring for translating the rotational threading force from the adjustment ring to a longitudinal compressing displacement of the first expandable ring, causing an outer surface of the first expandable ring to fit to the inner surface of the fitting tube;

a stop attached to the adapter tube for preventing the adjustment ring from separating from the adapter tube;

a second expandable ring placed on the outer circumferential surface of the adapter tube and comprising of elastic material for expanding and fitting to the inner surface of the fitting tube; and a spacer placed on the outer circumferential surface of the adapter tube for keeping the first expandable ring and the second expandable ring apart at a predetermined distance.

2. The adapter mount of claim 1, wherein the first and second expandable rings are made of rubber.

3. The adapter mount of claim 1, wherein the first and second expandable rings are made of elastic material.

4. The adapter mount of claim 1, wherein the fitting tube is a telescope eyepiece adapter.

5. The adapter mount of claim 1, wherein the fitting tube is a gun-sight barrel adapter.

6. The adapter mount of claim 1, wherein the fitting tube is a water pipe.

7. The adapter mount of claim 1, wherein the stop is a ring stop threaded to the adapter tube.

8. The adapter mount of claim 1, wherein the stop is a set-screw affixed to the adapter tube.

* * * * *